United States Patent [19]
Korycki et al.

[11] Patent Number: 5,428,963
[45] Date of Patent: Jul. 4, 1995

[54] COMPRESSED AIR SYSTEM TO DELIVER DRY AND CLEAN AIR

[76] Inventors: Leszek S. Korycki, 31 Chatterton Blvd., Scarborough MiM 2G3 Jorma J. Lehtovaara, 627 The West Mall 101, Etobicoke M9C 4K5 both of Canada; Barbara M. Korycka, 140 BPW Club Rd. Apt. F21 Carrboro, N.C. 27510

[21] Appl. No.: 241,554

[22] Filed: May 12, 1994

[51] Int. Cl.⁶ .................. B01D 8/00; F25J 3/08; F25D 17/06; F25D 21/00
[52] U.S. Cl. ........................... 62/93; 62/272; 62/11
[58] Field of Search .......... 62/9, 11, 93, 272; 55/DIG. 17

[56] References Cited

U.S. PATENT DOCUMENTS

| | | | |
|---|---|---|---|
| 3,675,712 | 7/1972 | Paine et al. | 62/93 X |
| 3,739,594 | 6/1973 | Freese | 62/93 |
| 3,896,633 | 7/1975 | Moore | 62/272 |
| 4,242,110 | 12/1980 | Hynes | 62/93 X |
| 4,253,315 | 3/1981 | Fiedler | 62/93 X |
| 4,287,724 | 9/1981 | Clark | 62/272 |
| 4,497,182 | 2/1985 | Youngworth | 62/93 X |
| 4,680,938 | 7/1987 | Caley | 62/93 |
| 4,829,778 | 5/1989 | Schlensker | 62/272 |
| 5,230,166 | 7/1993 | Deng | 62/93 X |
| 5,327,740 | 7/1994 | Ogasawara et al. | 62/93 |

Primary Examiner—Christopher Kilner

[57] ABSTRACT

A compressed air system to deliver dry and clean air whereby the compressed air supplied by the air compressor is passed through a primary circuit of a heat exchanger and a liquid separator where it is cooled down close to the freezing point of the water so that the majority of the water vapor in the air will condense. The condensate as well as majority of the oil in the air is removed from the air stream with a centrifugal action inside the liquid separator which consists of a precooling chamber, cooling lines, conical centrifugal separator section, vertical center cavity and exit passage. The superheated air leaving the liquid separator unit can be dried further by passing the air through the freezer dryer units where its temperature is lowered below the freezing point of the water so that the remaining water forms into ice crystals and will get attached to the inside walls of the freezer dryer. The returning air from the liquid separator is guided through the secondary circuit of the heat exchanger before it enters the air reservoir tank. The remaining oil particles as well as rust and dust in the air stream can be removed with an oil filter unit placed downstream from the storage tank.

25 Claims, 8 Drawing Sheets

COMPRESSED AIR SYSTEM TO DELIVER DRY AND CLEAN AIR

The present invention relates to a system for drying and cleaning compressed air. It is especially suitable for applications which require dry and/or clean air such as spray paint installations or special manufacturing process or laboratory air systems.

It is well known that the presence of water droplets in the spray paint air will cause so called fish-eye effect on the paint, which is unacceptable for high quality paint requirements. Furthermore, the oil and dirt particles introduced to the air stream by the compressor are also detrimental to the quality of paint job. The most effective known method of removing water from the air is using an air dryer system installed after the compressor and comprising a heat exchanger, a refrigeration unit, a demister and an optional second heat exchanger as described in U.S. Pat. Document No. 4,242,110. The known systems, however, are inefficient especially after a certain period of operation since they are unable to remove continuously large quantities of water, which may reach several gallons during a day. Furthermore, the system described above is not particularly effective to remove oil or solid dirt particles. In some known applications, the efficiency of the system has been improved by adding features to regenerate the demister and adding oil separators or changeable water separators as described in U.S. Pat. Documents Nos. 3,572,008 and 4,242,111. However, all these systems have a drawback of either having insufficient capacity for removing the water and/or that water removal units interfere with the operation of the oil removal or vice versa.

The principal objective of the invention is to provide a system to remove water effectively continuously from the compressed air by using a liquid separator unit which is not only unaffected by the presence of oil but is also capable of removing almost all oil from the air.

The second objective is to provide an air drying and cleaning system, which will remove all oil from the air stream by adding an additional oil filter unit typically after the air reservoir.

The third objective of the invention is to provide an air dryer system, which is capable of supplying very dry air for user applications, such as some special manufacturing process or laboratory systems, which have extremely tight specifications for the amount of water allowed, by adding one or more freezer dryer units into the air delivery system.

The fourth objective of the invention is to provide a compact design to reduce the size of the air dryer circuit by attaching refrigeration circuit components to a liquid separator unit.

The following detailed description of the compressed air drying and purification systems and their components explain the preferred embodiments of the invention. However, the invention is not limited to the constructions described but covers any of systems or components within the enclosed claims.

In its basic, preferred form, the compressed air system to produce dry air according to the invention comprises a heat exchanger, a special liquid separator unit and a refrigeration circuit, installed between a conventional compressed air source and a storage tank of a known design. The use of the heat exchanger is not absolutely necessary, but it will greatly increase the efficiency of the system to separate water from the air stream, hereby making it possible to use a smaller size liquid separator and refrigeration circuit combination for a particular capacity compressed air system.

The liquid separator unit in its basic form comprises a distributor chamber, a cooling section, a centrifugal separator, a centre cavity, and an exit passage, all encapsulated inside the main container which serves both as a frame for the unit as well as a heat insulated container for refrigerated media used to reduce the compressed air temperature down to just slightly above the freezing point of water and which refrigerated media is kept in low temperature by a refrigeration circuit. In its preferred form the cooling section consists of several parallel or near parallel cooling lines forming a passage for the compressed air, immersed inside the above-mentioned refrigerated media. The bottom ends of each of these cooling lines are aligned tangentially or nearly tangentially to the wall of the centrifugal separator so that the air entering the separator is forced to swirl inside the separator and centre cavity. In order to improve the alignment of the air stream and to increase its speed and centrifugal forces, it is also possible to install nozzles into the bottom ends of the cooling lines.

The oil filter unit of this invention in its preferred form consists of a cylindrical filter container filled with oil absorbent material placed between a distributor disk and a support plate and a dust filter pad at the exit end. In another embodiment of the invention, there can be two or more of the distributor disk/absorbent sections stacked together in series one behind another inside the said filter container.

Certain processes, such as some laboratory systems, may be very sensitive for the water content of the compressed air and may require that practically all vaporized water should be removed from the air stream. In order to achieve this, the compressed air drying system can be further enhanced by installing a freezer dryer unit into the return line of the compressed air system between the liquid separator unit and the secondary circuit of the heat exchanger. The freezer dryer unit consists of an pre-cooling chamber, several parallel or near parallel freezer lines surrounded by refrigerated media with a temperature below freezing point of water, a collector chamber, a centre passage and an exit port. The operational principal of the freezer dryer unit is, that the temperature of the air stream flowing through the unit is reduced considerably below that of the freezing point of the water. This will result in most of the water vapor within the air condensating and turning into ice and attaching to the walls of the freezer lines eventually blocking the air passages. In air dryer systems requiring continuous high volume output, several of these freezer dryer units can be linked parallel to each other so that at least one unit can always be operational when others go through thawing and/or pre-cooling cycles.

The invention, as exemplified by preferred embodiments, is described with reference to drawings in which.

Figure 1:
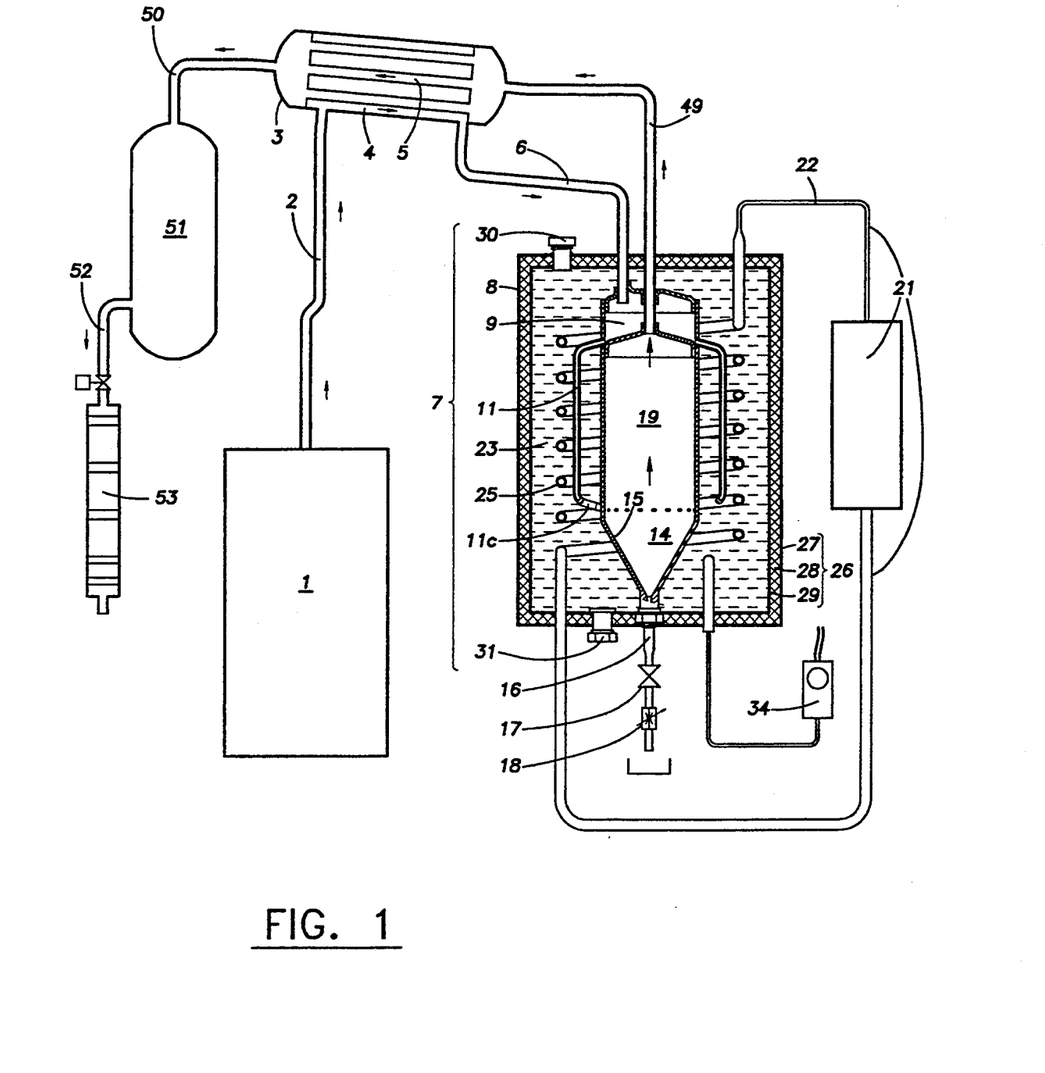
FIG. 1 is a schematic diagram of a compressed air supply system with a liquid separator unit and an oil filter unit.
Figure 2:
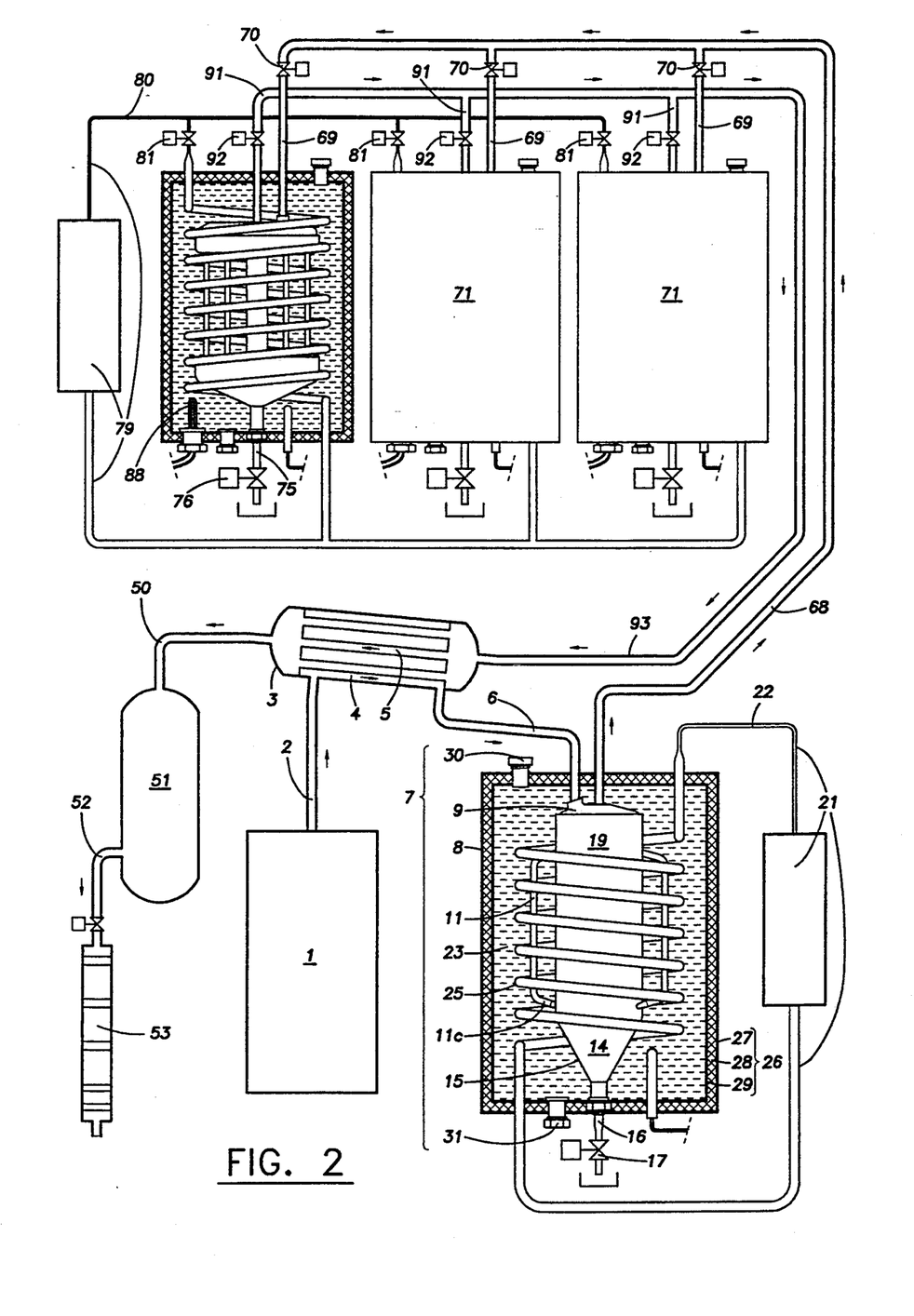
FIG. 2 is another schematic diagram of a compressed air supply system, similar to the one shown in FIG. 1 added with three parallel freezer dryer units.

Referring to the drawings, the preferred embodiment of the invention shown, comprises a compressed air source 1, a primary and secondary circuits 4 and 5 of the heat exchanger 3, a liquid separator unit 7, a water dump line 16, a water dump device 17, a refrigeration circuit 21, an air reservoir tank 51, and an oil filter unit 53. The compressed air source 1 can be any known system capable of supplying pressurized air. The FIGS's 1 and 2 show a typical arrangement of the air supply comprising among other things an air compressor and an optional check valve. The compressed air source can also includes an after-cooler, which is actually a heat exchanger cooled down either with cold water and/or air cooling fans. After leaving the compressed air source 1 through the pipe line 2, the air stream enters the primary circuit 4 of the heat exchanger 3. The temperature of the compressed air is reduced inside the primary circuit 4 of the heat exchanger due to the low temperature air passing the secondary circuit 5 of the heat exchanger on its way from the liquid separator unit 7 to the air reservoir tank 51.

Figure 3:
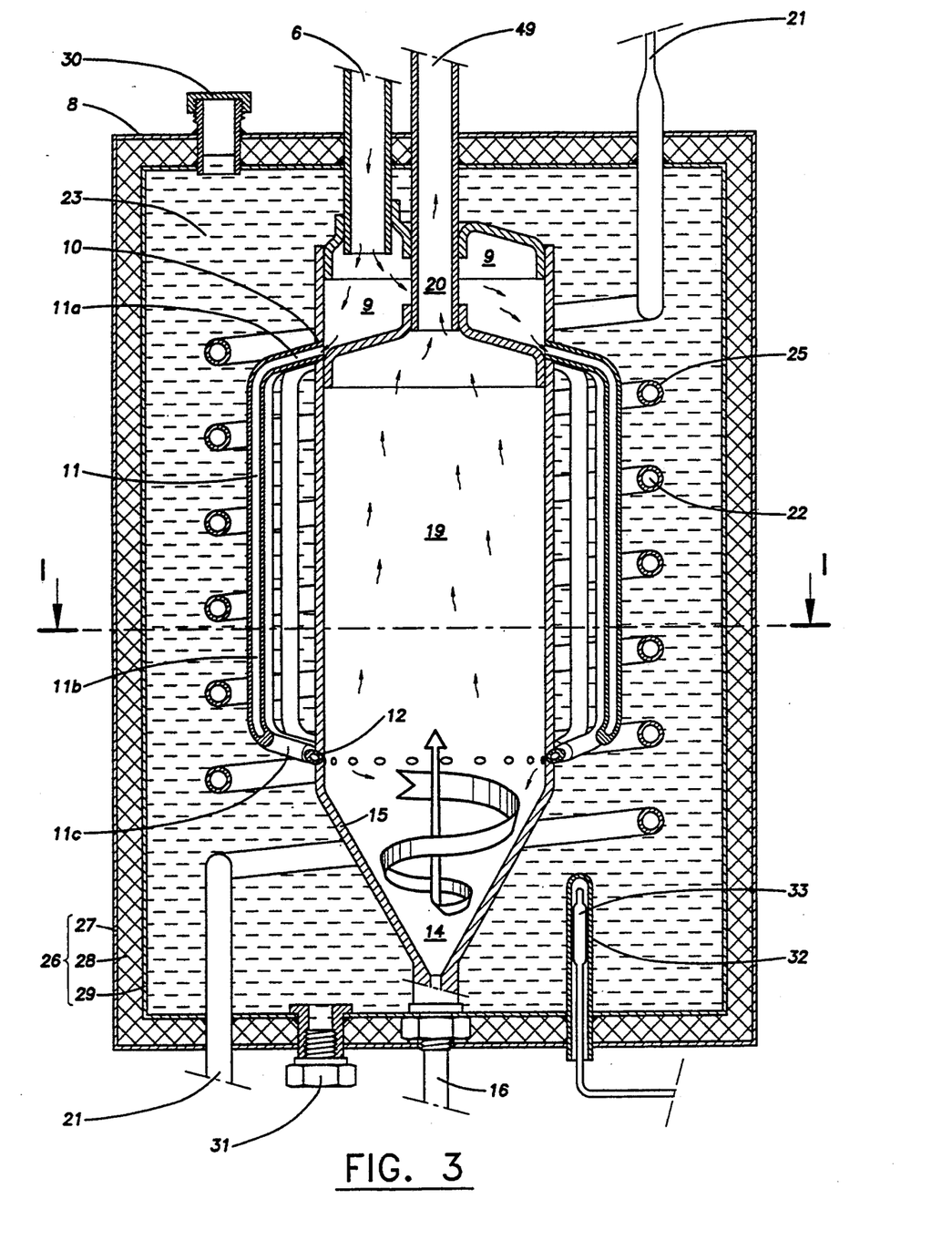
FIG. 3 is a sectional side view of a preferred embodiment of the liquid separator.
Figure 6:
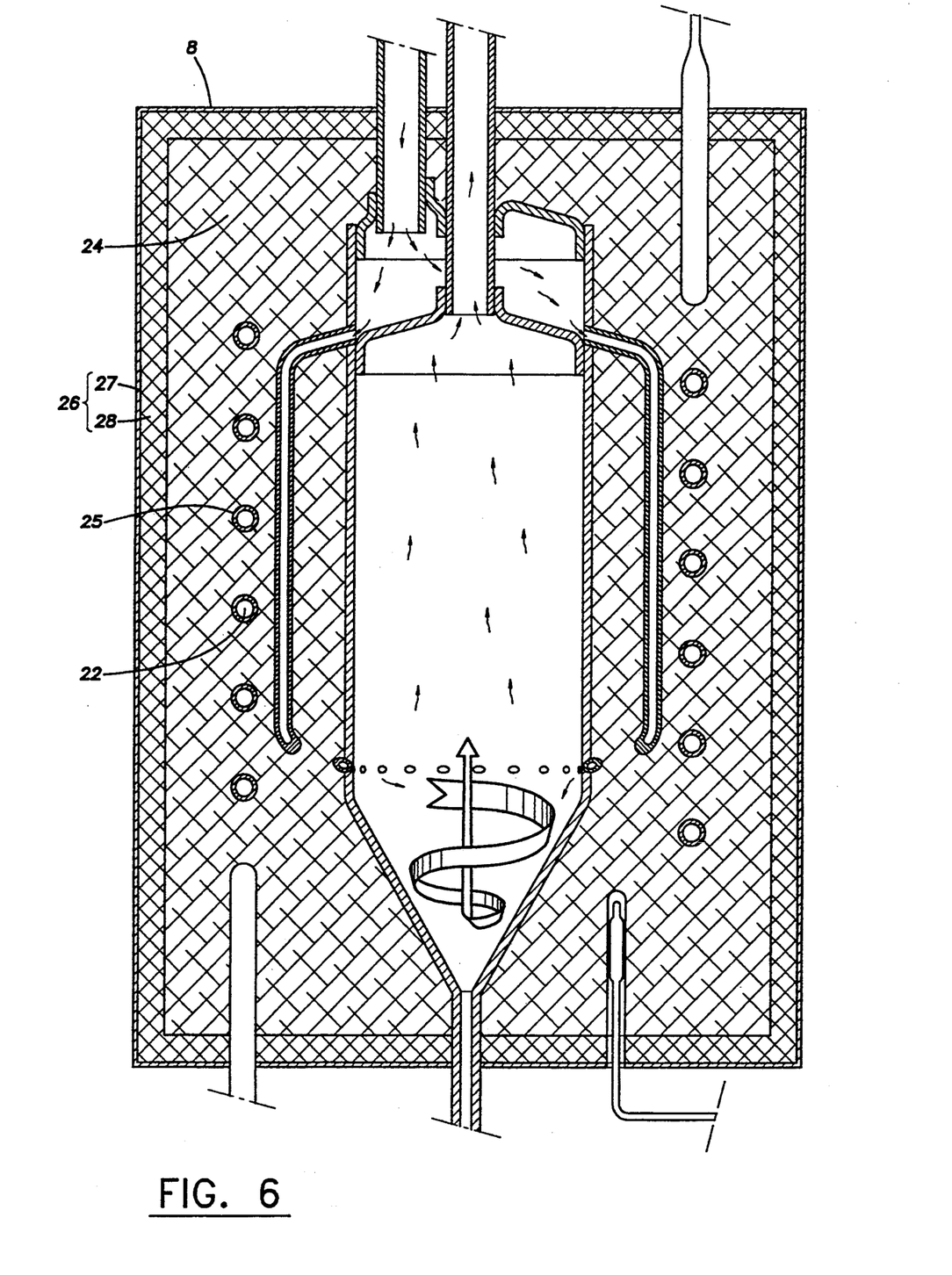
FIG. 6 is a sectional side view of the liquid separator wherein the secondary refrigerated media is solid material.

After the compressed air leaves the heat exchanger via the air line 6, it enters the distributor chamber 9 of the liquid separator unit 7 and is distributed to flow through a multitude of cooling lines 11, which are surrounded by the refrigerated media 23. Since the cooling lines 11 act as a heat exchanger, the temperature of the compressed air inside the lines 11 falls below the dew point causing the excess water to liquefy and form tiny droplets. The temperature of the refrigerated media is generally kept at temperature, which is approx 10° F. below the temperature at the point where the compressed air is being used, preferably with the help of a thermostat 34. However, if this temperature specified above for the refrigerated media falls considerably below the freezing point of water, a care must be taken that the refrigerated media temperature is kept high enough to stop water in the air stream to form into ice crystals. The compressed air now flows through the bottom section 11c of the cooling lines 11 which are oriented tangentially or almost tangentially to the walls of the centre cavity 19 and simultaneously aligned slightly downwards in such a way that the air stream swirls inside the centrifugal separator 14 as demonstrated with the thick arrow in FIG's 3 and 6.

In order to increase the angular velocity of the whirling air inside the centrifugal separator 14, it is recommended that the walls 15 of the unit are tapered so that the shape of the separator 14 resembles that of a cone standing on its small end as shown in FIG.'s 3 and 6. After whirling initially downwards as demonstrated by the above-mentioned thick arrow in FIG's 3 and 6, the air stream turns upwards to raise inside the centre cavity 19. Because of the centrifugal forces of the whirling vortex action of the air, the above-mentioned, newly formed water droplets in the compressed air are driven against the walls of the centrifugal separator 14 and the centre cavity 19. The centre cavity 19 has a relatively large diameter and, therefore, the velocity of the air slows down inside the centre cavity 19. This feature of the relatively slow raising air stream makes sure that the water, which is accumulated on the walls of the centrifugal separator 14 and the centre cavity 19, will not get picked back into the air stream but it is rather flowing downwards towards the water dump line 16 at the bottom of the centrifugal separator 14.

After raising inside the centre cavity 19, the air now flows through the exit passage 20 located at the top of the liquid separator unit 7. The exit passage 20 passes through the distributor chamber 9 and the exit air stream, consequently, will partially cool down the new air entering the said distributor chamber 9. The air stream, still at quite a low temperature now passes via an air line 49 to the secondary circuit 5 of the heat exchanger 3, where it will get heated up and the new air from the compressed air source 1 flowing through the primary circuit 4 of the heat exchanger 3 will be cooled down. The return air stream now enters the reservoir tank 51 via an air line 50.

The air in the centrifugal separator unit 14 and in the centre cavity 19 is at very low temperature, where it it looses all free water. When the air gets heated up both inside the exit passage 20 and later in the secondary circuit 5 of the heat exchanger 3, the water vapor becomes superheated and, therefore, it has no tendency to condensate inside the pipe lines and/or storage tank. Consequently, the air stream stay totally free of water droplets which could harmfully affect the processes down the line.

The liquid separator unit 7 is encapsulated inside the main container 8, which has walls 26 consisting of several layers. The innermost layer 29 is made of material compatible with the refrigerated media 23. The innermost layer 29 is covered with thermal insulation material 28 to avoid the raise of the temperature of the refrigerated media 23 inside the unit. In case the insulation material 28 is structurally weak, it must further be protected by the very outside jacket 27.

Figure 4:
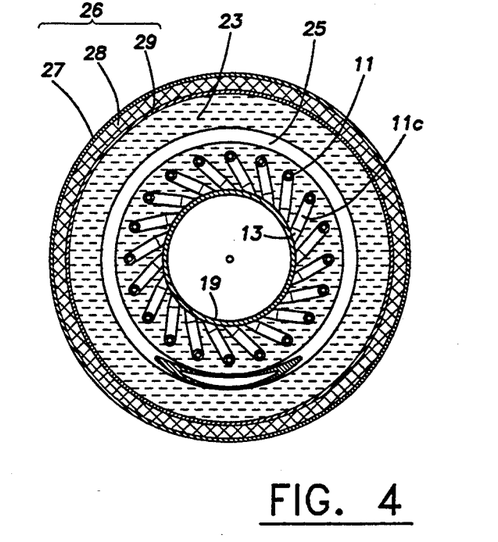
FIG. 4 is a cross-sectional view of the liquid separator unit as shown in FIG. 3 and taken along reference line I—I thereof.

The cooling lines 11 of the liquid separator unit 7 are preferably shaped so that their middle sections 11b are in a minimum angle of 45° both to the top and bottom sections 11a and 11c of the lines and clearly outside the centre cavity 19 as shown in FIG. 3. This particular c-shape design has two advantages. Firstly the thermal expansion in the middle section 11b can be taken by the bending of the top and bottom sections 11a and 11c without causing excessive stresses in the end joints 10 and 12 of the lines. Secondly the refrigerated media 23 can flow freely around the cooling lines 11 to increase the heat transfer between the lines 11 and the refrigerated media 23. The said cooling lines 11 are preferably positioned symmetrically around the centre cavity 19 as shown in FIG. 4, and they are relatively small in diameter in order to maximize the cooling effect of the air flowing through them. Further, the number of the cooling lines 11 and their length and diameter has to be selected in such a way that the cooling effect on the compressed air is sufficient enough to match the volume of air flowing through the liquid separator unit 7. In order to increase the speed of the air flowing through the bottom section 11c of the cooling lines into the centrifugal separator 14, it is possible to install air nozzles 13 in the exit ends of the cooling lines 11.

Figure 5:
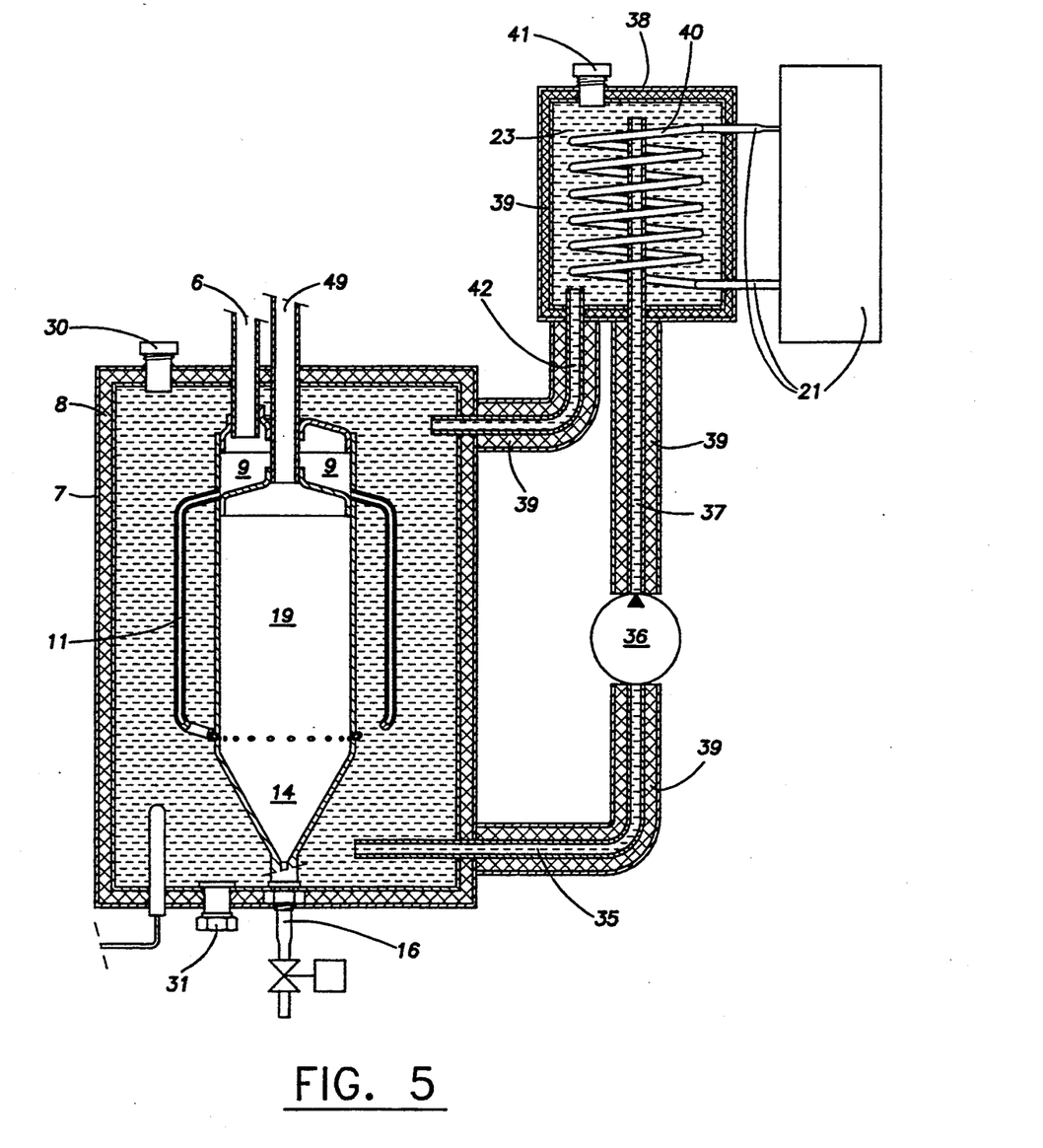
FIG. 5 is a sectional side view of the liquid separator with external refrigeration coil and a pump for the secondary refrigeration media.

The refrigerated media 23 can be the very same primary refrigerant 22 flowing through the refrigeration apparatus in the refrigeration circuit 21, or it can be a secondary refrigerated media cooled down by the primary refrigerant, which flows through the internal refrigeration coil 25 located inside the main container 8 as shown in FIGS's 3 and 4. It is also possible to replace the internal refrigeration coil 25 by an external refrigeration coil 40 located inside a separate refrigeration exchange container 38 as shown in FIG. 5. In this case the secondary refrigerated media 23 is circulated by by a pump 36 through pipe lines 35, 37 and 42. In order to reduce the heat flow through the walls of the said pipe lines and the refrigeration exchange container walls these should be covered by insulation material 39. The use of an external refrigeration coil is especially preferred when drying air from a large output compressed air source, because the heat exchange action can be increased by a reasonable large external refrigeration coil 40 and the pump 36 without increasing the physical size of the main container 8 of the liquid separator 7.

If the system does not contain any secondary refrigerated media, any internal refrigeration coil will be omitted from the system and the primary refrigerant 22 is guided to flow directly inside the main container 8. However, the use of the secondary refrigerated media is preferred since this will reduce the amount of expensive and hazardous primary refrigerant. The secondary refrigerated media can be any material, either a liquid, which has a lower freezing point than water, e.g. commercially available car radiator antifreeze coolants or solid material with good thermal transfer properties. In case the secondary refrigerated media 24 is solid material as mentioned above, the innermost layer 29 of the main container 8 can be omitted and the thermal insulation material 28 applied directly onto the solid refrigerated media block 24 as shown in FIG. 6. In this case the internal cavities of the unit can be either similar prefabricated components as shown in FIG. 6, around which the solid material has been cast to fill the space around these internal components or they can be passages and cavities, which have been cast or fabricated directly into the otherwise solid refrigerated media block 24. Liquid separator units, which are using liquid as a secondary refrigerated media, can also have a filler cap 30 and a drain plug 31 for the initial filling and/or servicing of the unit. If the previously mentioned refrigeration exchange container 38 is located at a higher elevation than the main container 8, it should also have a separate filler cap 41 as shown in FIG. 5. The refrigeration apparatus can be any known equipment used to supply low temperature primary refrigerant such as a refrigeration compressor with a condenser or an absorption unit. In order to control the temperature of the refrigerated media 23/24 by a thermostat 34, a thermostat sensor 33 should be inserted into the main container inside the refrigerated media. In its preferred embodiment this is being done by constructing a thermostat well 32 vertically into the bottom of the main container 8 in such a way that it will not interfere when the refrigeration coil 25 and/or the centrifugal separator 14 are assembled into the said main container 8 and placing the thermostat sensor 33 inside the said well 32.

At the bottom of the centrifugal separator, there is a water dump line 16. In its preferred embodiment this line 16 is equipped with a water dump device 17, which is preferably remotely controlled valve as schematically shown in FIG. 2. Since the volume of the separated water even from small paint compressor can be several gallons per day, it is preferred that the water dump valve 17 is automatically opened when every the air compressor is running. In order the minimize the air losses from the system, the water dump line 16 can also be equipped with an orifice 18 as shown in FIG. 1. The said orifice 18 can be either of a fixed size or adjustable. In order to simplify the design of the system, it is also possible to omit the water dump valve 17 all together, but this will naturally increase the air losses in the system.

In its preferred form the combination of the primary circuit 4 of the heat exchanger and the liquid separator unit 7 is constructed in such a way that there are no major water traps along the air passage, i.e. any condensed water, which will occur in these units can flow downwards to the water dump line 16.

Figure 7:
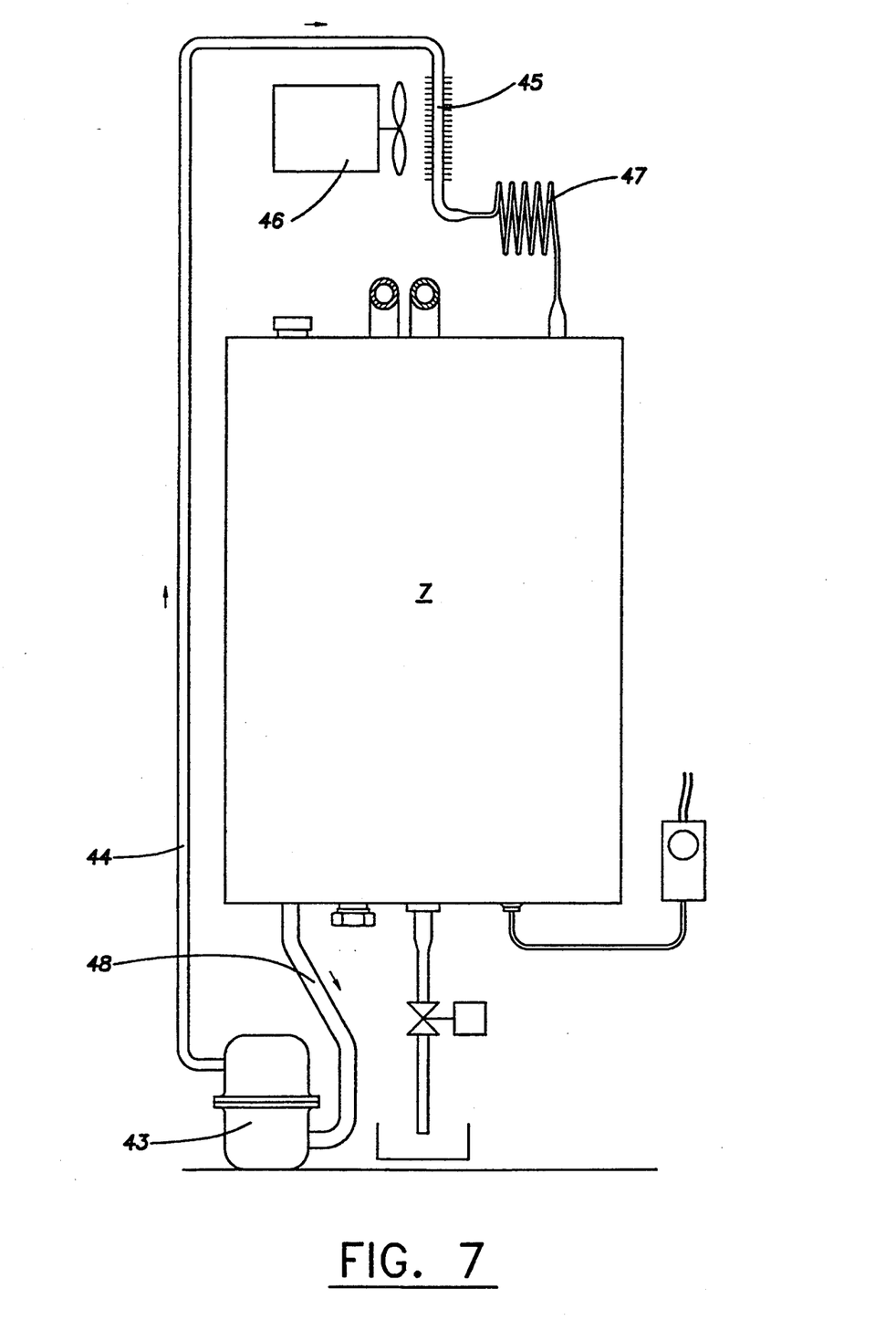
FIG. 7 is a side view of an assembly of a liquid separator unit and a refrigerant circuit for small to medium size compressed air networks.

The physical size and construction of the individual components of the liquid air cleaning system according to the invention can vary within the description and the claims of this document. In FIG. 7 there is shown a construction of an assembly of a liquid separator unit 7 and a refrigeration circuit which is especially suited for the air cleaning apparatus to be used in small or medium size paint systems. In this particular embodiment of the invention the refrigeration compressor 43 is placed near the floor at the bottom of the assembly just below the liquid separator unit 7. The condenser 45 is located at the top of the assembly and just below it, between the condenser 45 and the liquid separator 7 is the expansion device 47. The high pressure primary refrigerant flows from the compressor 43 through the discharge line 44 to condenser 45, where it is liquefied. The refrigerant now continues its way through the expansion device 47 to the refrigeration coil inside the liquid separator 7 where it regasifies. The gasified primary refrigerant flows back to the refrigeration compressor 43 through the return line 48. Not only does the design described take a minimum amount of floor space, but it also requires a minimum quantity of refrigerant due to the fact that the refrigerant is in liquid form only inside the capillary tubing 47 between the condenser 45 and the refrigeration coil. If the condenser 45 is air cooled by a fan 46, the design according to the invention also greatly reduces the amount of airborne dirt, which is normally present close the floor, entering the cooling fins of the condenser 45.

Figure 8:
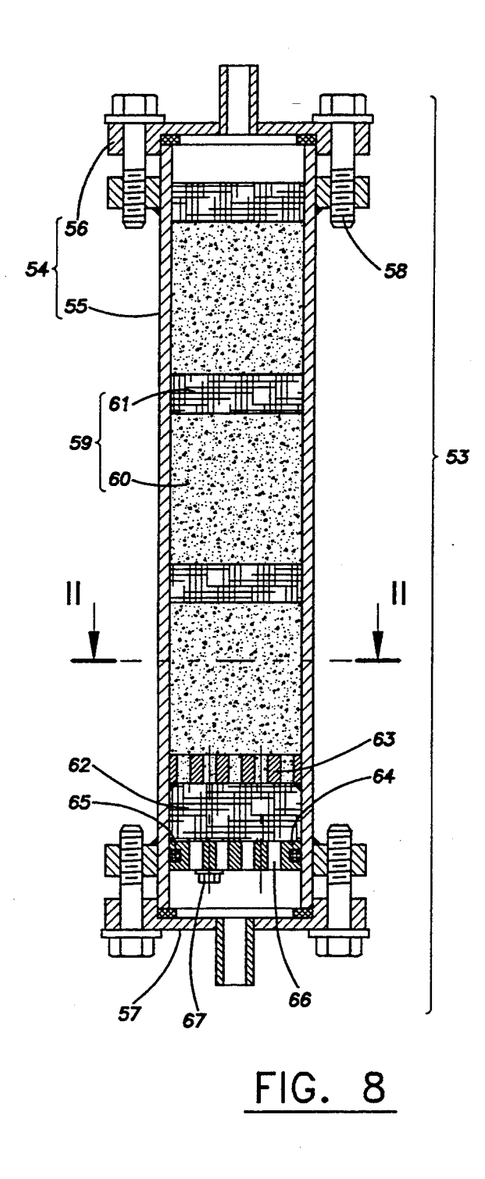
FIG. 8 is a sectional side view of a preferred embodiment of the oil filter unit.

The oil in the compressed air, most likely introduced into the air system by the air compressor, is normally present in the form of very fine mist. Because of the centrifugal action inside the liquid separator unit 7, the majority of the oil particles are driven against the walls 15 of the the centrifugal separator 14 due to the centrifugal forces in the same way as the water droplets. Therefore, the majority of the oil is removed from the air stream together with the out flowing water through the water dump line 16. However, if totally oil free air is required, the air system must be equipped with a secondary oil filter unit 53 as shown in FIG.'s 1 and 2. The more detailed construction of the oil filter unit is shown in FIG. 8. The unit consists of a cylindrical filter container 54, inside which is an absorbent media section 59 filled with oil absorbent media 60, such as ground earth clay with crystalline silica, and a distributor disk 61 placed at the air entry end of the absorbent media section 59. In its preferred embodiment, the distributor disk 61 is made of filter felt, which guides the air flow evenly over the entire cross section of the unit. It is also possible, but not absolutely necessary, to construct the filter unit to have two or more of these absorbent media sections 59 placed in series one behind another as shown in FIG. 8.

Figure 9:
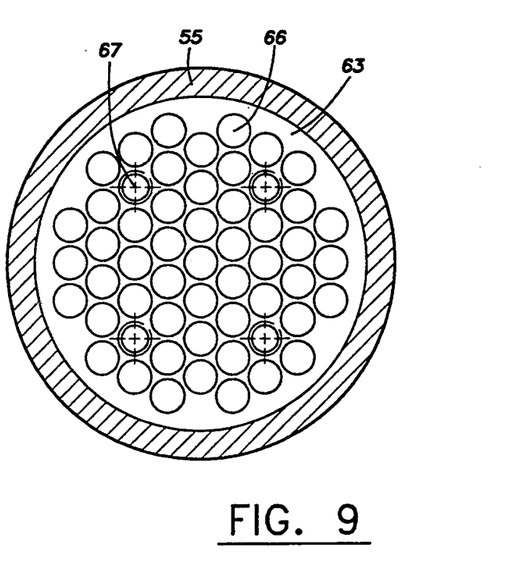
FIG. 9 is a cross-sectional view of the oil filter unit as shown in FIG. 8 and taken along reference line II—II thereof.

Because of the absorbent media 60 may have very fine particles, which can be carried away with the air stream, it is preferred that the oil filter unit 53 also has a separate dust filter section placed at the exit end of the oil filter unit 53 to trap these airborne solid particles. The dust filter section consists of a filter pad 62, placed between two support plates 63 and 64. The filter pad 62 can be made out of the same, commercially available filter felt material as the distributor disks 61. The support plates 63 and 64 have a multitude of holes 66 as shown in FIG. 9 to distribute the air stream evenly through the filter pad 62. In order to make sure that the air stream is guided through the filter pad 62 and cannot escape through the gaps between the pad 62 and the outside wall 55 of the filter unit, it is preferred that the filter pad 62 is squeezed tightly between the support plates 63 and 64 with the bolts 67 which go through the said filter pad and plates and that both support plates 63 and 64 are also sealed against the wall 55 with o-rings 65 or at least one of the plates is permanently fixed to wall of the unit by brazing, welding, rolling or like.

If the oil filter unit does not have a special dust filter, it must nevertheless have at least one air distributor disk 61 and a support plate 63 at the end of the unit to stop the absorbent media flowing out from the unit. In order to make it easier to change either the oil absorbent media or the dust filter, it is recommended to have at least one end cap 56/57 of the filter unit 53 fixed to the cylindrical filter container 54 with bolts 58.

Figure 10:
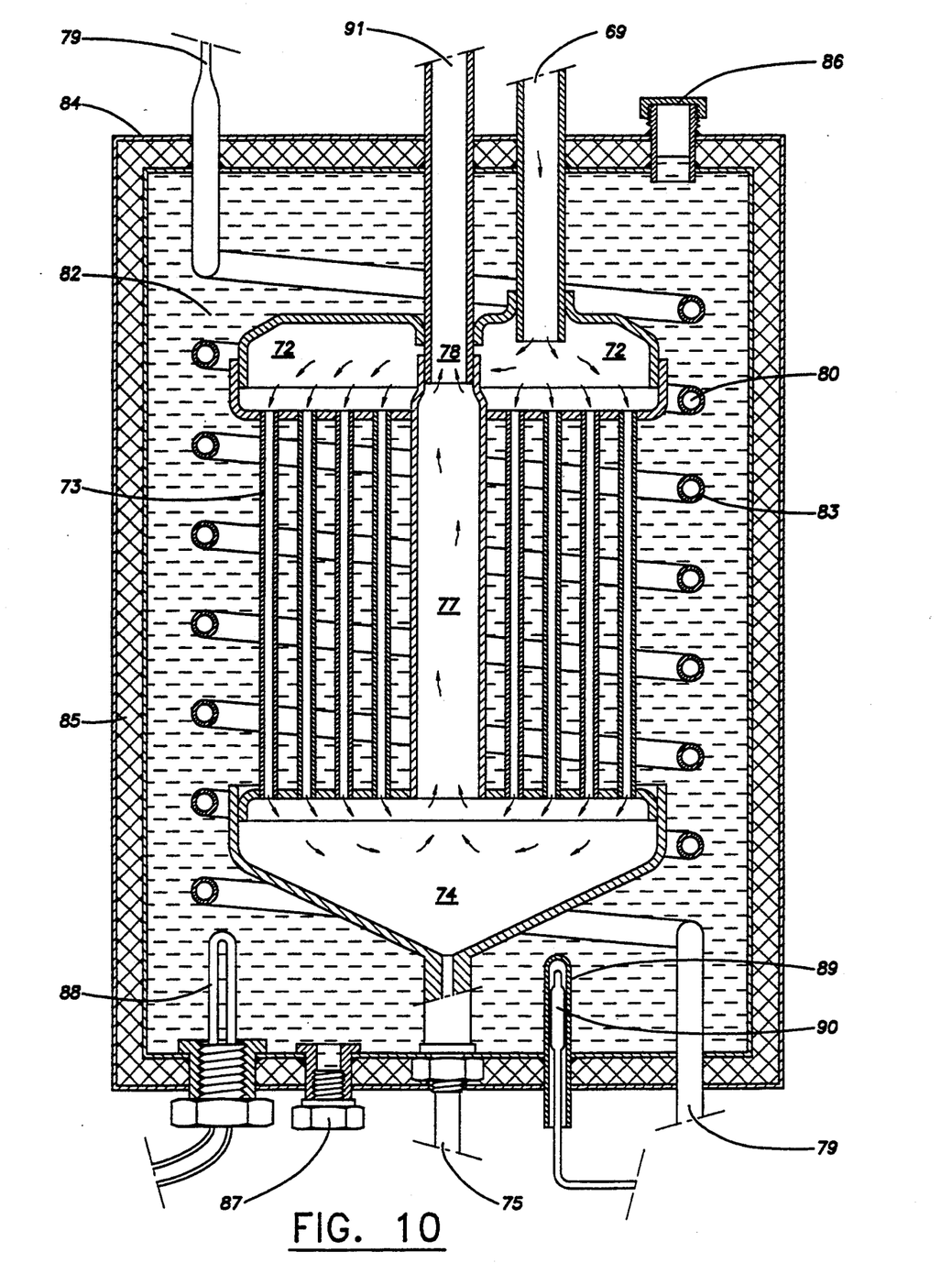
FIG. 10 is a sectional side view of a preferred embodiment of the freezer dryer unit.

The schematic for a air drying system capable of producing laboratory grade dry air is shown in FIG. 2. The return air line 68 from the liquid separator unit 7 is connected to one or more of the parallel freezer dryer units 71. The exit line 93 from these units is connected to the secondary circuit 5 of the heat exchanger 3. The construction of the freezer dryer unit 71 as shown in FIG. 10 resembles that of the liquid separator unit 7. The freezer dryer unit 71 consists of a main container 84 with an insulated wall 85 containing refrigerated media 82, a refrigeration coil 83, a pre-cooling chamber 72, a multitude of freezer lines 73, a collector chamber 74, a centre passage 77, an exit port 78, and the refrigeration circuit 79 including the actual refrigeration apparatus and one or more of condensers. Similarly to the liquid separator the freezer dryer can also be equipped with a filler cap 86 and a drain plug 87. The temperature of the refrigerated media 82 is kept below the freezing point of water by controlling the operation of the refrigeration circuit 79 with the help of a thermostat and a thermostat sensor 90 located inside the thermostat well 89. Consequently, the temperature of the air in the freezer lines 73 also drops below the freezing point of water, causing the water vapor in the air stream to condensate and to form into ice crystals. In order to avoid the blocking of the same freezer lines 73 by this ice, the unit is constructed to have a great number, even as many as a coupled hundred of these freezer lines 73 and they contain no nozzles in there exit ends. Because there is no liquid water present inside the centre passage 77, it is preferred to make the centre passage 77 relatively small in diameter and simultaneously construct the collector chamber 74 much larger in diameter than the centre passage 77 as shown in FIG. 10, so that the incoming air streams from the various freezer lines 73 are entering the collector chamber 74 parallel to each other. The refrigeration circuit 79 of a freezer dryer as shown in FIG. 2 can be constructed in the same way as the one in a liquid separator unit 7, i.e. it can use either a primary refrigerant 80 only or it can have also a secondary refrigerated media 82 which is cooled down by using a refrigeration coil 83. Again the secondary refrigerated media can be either liquid or solid. Similarly to the liquid separator unit 7 the refrigeration apparatus serving the freezer dryer 71 can be of any known construction.

The ice crystals formed in the freezer dryer unit 71 will eventually block the unit, so that no air can pass through. Therefore, the capacity of the unit must be selected in such a way that it is large enough to comply with the requirements of the running time of the unit, so that the unit can be thawed and pre-cooled before the next operation. The other alternative is to furnish the system with two or more of the parallel freezer dryer units 71 as shown in FIG. 2. In this case the individual air lines 69 and 91 entering and leaving the units must be equipped with valves 70 and 92, which can be opened and closed. By operating the said valves 70 and 92 as well as the refrigerant entry valves 81, the freezer dryer units 71 can be made to operate in sequence, so that when one unit is operational, another is being either thawed or pre-cooled. In order to speed up the thawing of the freezer dryer unit, they can be equipped with a heating element 88 located inside the main container 84. During the thawing the melted ice will flow out through the water exit line 75 and the open water exit valve 76, which is kept closed during the normal operation of the freezer dryer unit 71.

Although only some embodiments of the present invention with slight variations has been described and illustrated, the invention is not limited to the detail features of these particular embodiments, but includes all variations and modifications within the scope of the claims.

The embodiments of the invention in which an exclusive property or privilege is claimed are defined as follows:

1. A compressed air system comprising in combination:
   a compressed air supply unit of any known design having means to deliver compressed air via an outlet pipe line;
   a liquid separator unit connected to said outlet pipe line of said compressed air supply unit, wherein said liquid separator unit comprises a main container, internal components, a water dump line, and an exit passage, said internal components consisting of a distributor chamber, several cooling lines, a centrifugal separator, and a centre cavity, said outlet pipe line being connected to said distributor chamber, the cooling lines connected at their inlet end to said distributor chamber and at their outlet end to said centrifugal separator, said centrifugal separator being connected to said centre cavity, which said centre cavity being connected to said exit passage, which exit passage passes through said distributor chamber and the walls of said main container, so that the compressed air from said outlet pipe line of the compressed air supply can flow in sequence through said distributor chamber, cooling lines, centrifugal separator, centre cavity and exit passage, wherein said water dump line is connected to the bottom of said centrifugal separator and is further passing through the walls of said main container whereby the liquid collected inside said centrifugal separator can flow out from the unit through said water dump line, whereby said internal components are encapsulated inside said main container and the cavity between the inside walls of said main container and the external surfaces of said internal components, said exit passage and said water dump line is filled with refrigerated media;

a refrigeration circuit connected to said main container so that said refrigerated media inside said main container can be cooled down by said refrigeration circuit; and a compressed air reservoir connected to said exit passage of the liquid separator unit for the compressed air to flow from said liquid separator unit to said air reservoir.

2. A compressed air system in accordance with claim 1, in which said system also has a heat exchanger comprising of a primary circuit and a secondary circuit for heat to transfer from the walls of said primary circuit to the walls of said secondary circuit, said heat exchanger being installed in such a position that said primary circuit is connected between said air supply unit and said distributor chamber of the liquid separator unit and said secondary circuit is connected between said exit passage of said liquid separator unit and said air reservoir.

3. A compressed air system in accordance with claim 2, in which said heat exchanger and liquid separator are constructed in such a way that water condensated inside said primary circuit of the heat exchanger can flow down to said water dump line.

4. A compressed air system comprising in combination:

a compressed air supply unit of any known design having means to deliver compressed air via an outlet pipe line;

a liquid separator unit connected to said outlet pipe line of said compressed air supply unit, wherein said liquid separator unit comprises a main container, internal components, a water dump line, and an exit passage, said internal components consisting of a distributor chamber, several cooling lines, a centrifugal separator, and a centre cavity, said outlet pipe line being connected to said distributor chamber, said cooling lines connected at their inlet end to said distributor chamber and at their outlet end to said centrifugal separator, said centrifugal separator being connected to the centre cavity, which said centre cavity being connected to said exit passage, which exit passage passes through the walls of said main container, so that the compressed air from said outlet pipe line of the compressed air supply can flow in sequence through said distributor chamber, cooling lines, centrifugal separator, centre cavity and exit passage, wherein said water dump line is connected to the bottom of said centrifugal separator and is further passing through the walls of said main container whereby the liquid collected inside said centrifugal separator can flow out from the unit through said water dump line, whereby said internal components are encapsulated inside said main container and the cavity between the inside walls of said main container and the external surfaces of said internal components, said exit passage and said water dump line is filled with refrigerated media;

a liquid separator refrigeration circuit connected to said main container so that said refrigerated media inside said main container can be cooled down by said refrigeration circuit;

a freezer dryer unit connected to said exit passage of the liquid separator unit, wherein said freezer dryer unit comprises a freezer dryer container, freezer dryer internal components, a water exit line with an exit valve, and an exit port, said freezer dryer internal components consisting of a pre-cooling chamber, several freezer lines, a collector chamber, and a centre passage, installed between said liquid separator unit and said secondary circuit of the heat exchanger so that said exit passage of the liquid separator unit is connected to said pre-cooling chamber of the freezer dryer and said exit port of the freezer dryer is connected to the inlet of said secondary circuit of the heat exchanger in such a way that the compressed air leaving said exit passage of the liquid separator unit enters said pre-cooling chamber of the freezer dryer and flows further in sequence through said freezer lines, collector chamber, centre passage and exit port and then enters the inlet of said secondary circuit of the heat exchanger, wherein said exit port passes through the walls of said freezer dryer container and said water exit line is connected to the bottom of said collector chamber and is further passing through the walls of said freezer dryer container, said exit valve being installed at the section of the water exit line outside said freezer dryer container, whereby said freezer dryer internal components are encapsulated inside said freezer dryer container and the cavity between the inside walls of said freezer dryer container and the external surfaces of said freezer dryer internal components, said exit port and said water exit line, is filled with freezer refrigerated media;

a freezer refrigeration circuit connected to said freezer dryer container so that said freezer refrigerated media inside said freezer dryer container can be cooled down to the temperature below the freezing point of the water by said freezer refrigeration circuit;

a heat exchanger comprising of a primary circuit and a secondary circuit for heat to transfer from the walls of said primary circuit to the walls of said secondary circuit, said heat exchanger being installed in such a position that said primary circuit is connected between said air supply unit and said distributor chamber of the liquid separator unit and said secondary circuit is connected between said exit passage of said liquid separator and said air reservoir; and a compressed air reservoir connected to the outlet of said secondary circuit of the heat exchanger for the compressed air to flow from said secondary circuit of the heat exchanger to said air reservoir.

5. A compressed air system in accordance with claim 4, in which a refrigeration coil is immersed inside said freezer refrigerated media, whereby said refrigeration coil is connected to said freezer refrigeration circuit so that the primary refrigerant inside said freezer refrigeration circuit flows through said refrigeration coil.

6. A compressed air system in accordance with claim 4, in which said freezer refrigerated media is solid material having passages connected to said freezer refrigeration circuit so that the primary refrigerant inside said freezer refrigeration circuit flows through said passages inside said solid freezer refrigerated media.

7. A compressed air system in accordance with claim 4, in which said system has one or more of similar freezer dryer units installed parallel to said first freezer dryer unit so that they all are connected separately at the inlet ports of said pre-cooling chambers as well as at said exit ports.

8. A compressed air system in accordance with claim 7, wherein each of said freezer dryer units has a valve installed at both their inlet ports of said pre-cooling chambers as well as at said exit ports, wherein each of these said valves can be opened and closed independently.

9. A compressed air system comprising in combination:
a compressed air supply unit of any known design having means to deliver compressed air via an outlet pipe line;
a liquid separator unit connected to said outlet pipe line of said compressed air supply unit, wherein said liquid separator unit comprises a main container, internal components, a water dump line, and an exit passage, said internal components consisting of a distributor chamber, several cooling lines, more than five air inlets leading into a centrifugal separator, and a centre cavity, said outlet pipe line being connected to the said distributor chamber, said distributor chamber being connected to said centrifugal separator via said cooling lines, said centrifugal separator being connected to the centre cavity, which said centre cavity being connected to said exit passage, which exit passage passes through the walls of said main container, so that the compressed air from said outlet pipe line of the compressed air supply can flow in sequence through said distributor chamber, cooling lines, centrifugal separator, centre cavity and exit passage, said water dump line being connected to the bottom of said centrifugal separator and further passing through the walls of said main container, whereby the liquid collected inside said centrifugal separator can flow out from the unit through said water dump line, said internal components being encapsulated inside said main container and the cavity between the inside walls of main container and the external surfaces of said internal components, said exit passage and said water dump line being filled with refrigerated media, wherein said centrifugal separator is cone shaped having its bottom end inside diameter reduced close to the inside diameter of the said water dump line and the air inlets into said centrifugal separator being placed symmetrically or near symmetrically about the centre line of said centrifugal separator and oriented in such a way that the air entering said centrifugal separator is flowing tangentially or near tangentially to the walls of said centrifugal separator and initially downwards inside said centrifugal separator;
a refrigeration circuit connected to said main container so that said refrigerated media inside the main container can be cooled down by said refrigeration circuit; and
a compressed air reservoir connected to said exit passage of said liquid separator unit for the compressed air to flow from said liquid separator unit to said air reservoir.

10. A compressed air system in accordance with claim 9, in which said system also has a heat exchanger comprising of primary circuit and secondary circuit for heat to transfer from the walls of said primary circuit to the walls of said secondary circuit, said heat exchanger being installed in such a position that said primary circuit is connected between said air supply unit and said distributor chamber of the liquid separator unit and said secondary circuit is connected between said exit passage of the liquid separator unit and said air reservoir.

11. A compressed air system in accordance with claim 1, wherein said air reservoir has an exit pipe line, which is further connected to an oil filter unit comprising an inlet port, outside walls, an entry distributor disk, one or more auxiliary distributor disks, oil absorbent media, two support plates, a filter pad, and an outlet port, whereby said filter pad is sandwitched between said two support plates and placed immediately upstream from said outlet port so that the air leaving said filter unit must pass through said filter pad, said oil absorbent media being sandwitched upstream from said filter pad between one of said support plates and said entry distributor disk so that the air entering said filter unit through said inlet port must first pass through said entry distributor disk before flowing in sequence through said oil filter media and filter pad, wherein said auxiliary distributor disks similar but not necessary same as said entry distributor disk are inserted inside said oil absorbent media, said auxiliary distributor disks being shaped so that the air flowing through said oil filter unit must pass entirely through each of said auxiliary disks.

12. A compressed air system in accordance with claim 1, wherein said air reservoir has an exit pipe line, which is further connected to an oil filter unit comprising an inlet port, outside walls, an entry distributor disk, oil absorbent media, two support plates, a filter pad, and an outlet port, whereby said filter pad is sandwitched between said two support plates and placed immediately upstream from said outlet port so that the air leaving said filter unit must pass through said filter pad, said oil absorbent media being sandwitched upstream from said filter pad between one of said support plates and said entry distributor disk so that the air entering said filter unit through said inlet port must first pass through said entry distributor disk before flowing in sequence through said oil filter media and filter pad, wherein at least one of said support disks has a multitude of holes distributed over its entire cross-section and said support disk is sealed air tight against said outside walls of the oil filter unit by an o-ring.

13. A compressed air system in accordance with claim 1, in which said air inlets into said centrifugal separator are oriented in such a way that the air entering said centrifugal separator is flowing tangentially or near tangentially to the walls of said centrifugal separator and initially downwards inside said centrifugal separator.

14. A compressed air system in accordance with claim 9, in which said air inlets into said centrifugal separator have their diameters reduced so much that the velocity of the air entering said centrifugal separator is increased at least 36 per cent compared to the air velocity inside said cooling tubes.

15. A compressed air system in accordance with claim 14, in which the increase in the air velocity at said air inlets is achieved by installing separate nozzles at said air inlets.

16. A compressed air system in accordance with claim 1, in which said cooling lines have top, middle and bottom sections, wherein said cooling lines are formed in such a way that said middle sections of the cooling lines are vertical or near vertical and form a minimum angle of 45° with both said top and bottom sections of the cooling lines.

17. A compressed air system in accordance with claim 2, in which said cooling lines have top, middle and bottom sections, wherein said cooling lines are formed in such a way that said middle sections of the cooling lines are vertical or near vertical and form a minimum angle of 45° with both said top and bottom sections of the cooling lines.

18. A compressed air system in accordance with claim 1, in which a refrigeration coil is immersed inside said refrigerated media, whereby said refrigeration coil is connected to said refrigeration circuit so that the primary refrigerant inside said refrigeration circuit flows through said refrigeration coil.

19. A compressed air system in accordance with claim 18, in which a thermostat is installed inside a tubular-shape thermostat well located inside said main container, wherein said thermostat well is constructed at the bottom of said main container in such a location that it will not interfere with said refrigeration coil and centrifugal separator when these are being installed inside said main container.

20. A compressed air system in accordance with claim 9, in which said cooling lines have top, middle and bottom sections, wherein said cooling lines are formed in such a way that said middle sections of the cooling lines are vertical or near vertical and form a minimum angle of 45° with both said top and bottom sections of the cooling lines.

21. A compressed air system in accordance with claim 1, in which said refrigerated media is solid material having passages connected to said refrigeration circuit so that the primary refrigerant inside said refrigeration circuit flows through said passages inside said solid refrigerated media.

22. A compressed air system in accordance with claim 9, in which said exit passage passes through said distributor chamber.

23. A compressed air system in accordance with claim 18, in which said refrigeration circuit comprises a refrigeration compressor, a discharge line, an air cooled condenser, an expansion device, and a return line, said refrigeration compressor being installed underneath said liquid separator unit, said air cooled condenser located above said liquid separator unit, said air cooled condenser being connected to said refrigeration compressor by said discharge line and to said refrigeration coil of said liquid separator unit by said expansion device, and said refrigeration coil being connected to said refrigeration compressor by said return line.

24. A compressed air system in accordance with claim 1, in which a separate refrigeration exchange container is located outside said main container and connected to said main container by pipe lines in such a way that said refrigerated media can circulate between said main container and said refrigeration exchange container through said pipe lines and whereby a refrigeration coil is immersed inside said refrigeration exchange container and connected to said refrigeration circuit so that the primary refrigerant inside said refrigeration circuit flows through said refrigeration coil.

25. A compressed air system in accordance with claim 24, in which one of said pipe lines between said main container and said refrigeration exchange container is equipped with a pump whereby said pump is used to pump said refrigerated media through said pipe lines.

* * * * *